(12) United States Patent
Zhou et al.

(10) Patent No.: US 11,002,710 B2
(45) Date of Patent: May 11, 2021

(54) METHOD AND DEVICE FOR MEASURING MECHANICAL PARAMETERS OF MULTILAYER COMPOSITE THIN FILM STRUCTURE

(71) Applicant: SOUTHEAST UNIVERSITY, Nanjing (CN)

(72) Inventors: Zaifa Zhou, Nanjing (CN); Chao Sun, Nanjing (CN); Xinge Guo, Nanjing (CN); Qingan Huang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 324 days.

(21) Appl. No.: 16/329,244

(22) PCT Filed: Feb. 11, 2018

(86) PCT No.: PCT/CN2018/076248
§ 371 (c)(1),
(2) Date: Feb. 28, 2019

(87) PCT Pub. No.: WO2018/196466
PCT Pub. Date: Nov. 1, 2018

(65) Prior Publication Data
US 2019/0227036 A1 Jul. 25, 2019

(30) Foreign Application Priority Data

Apr. 28, 2017 (CN) .......................... 201710299770.4

(51) Int. Cl.
*G01N 29/12* (2006.01)
*G01N 3/02* (2006.01)
(Continued)

(52) U.S. Cl.
CPC ................ *G01N 29/12* (2013.01); *G01N 3/00* (2013.01); *G01N 3/02* (2013.01); *G01N 29/245* (2013.01);
(Continued)

(58) Field of Classification Search
CPC ........... G01N 29/12; G01N 3/00; G01N 3/02; G01N 29/245; G01N 2291/014;
(Continued)

(56) References Cited

U.S. PATENT DOCUMENTS 9,335,271 B2 * 5/2016 Pruessner .......... G01B 9/02004
2013/0330232 A1 * 12/2013 Pruessner .............. G01N 21/75
422/82.11

FOREIGN PATENT DOCUMENTS

CN 101769898 A * 7/2010
CN 106383404 A * 2/2017
CN 107063839 A * 8/2017 ......... G01N 29/2418

OTHER PUBLICATIONS

Quing-An Huang "Measurement of Material Properties of Individual Lyers for Composite Films by a Pull-in Method" (Year: 2006).*

* cited by examiner

*Primary Examiner* — Regis Betsch
*Assistant Examiner* — Kaleria Knox
(74) *Attorney, Agent, or Firm* — CBM Patent Consulting, LLC

(57) ABSTRACT

A method for measuring mechanical parameters of a multilayer composite thin film structure and belongs to the technical field of online tests of micro-electro-mechanical system (MEMS for short) material parameters. Equivalent Young modulus and equivalent residual stress of each layer of the multilayer composite thin film structure can be obtained in one step by means of solving an equation set on
(Continued)

the basis of a relationship between first-order resonance frequency of multilayer composite fixed-fixed beams and multilayer composite cantilever beams and parameters such as material characteristics and structure size, the online test of multilayer thin film materials can be realized, the test structure and calculating method are simple, and the accuracy is higher. The present invention further discloses a device for measuring mechanical parameters of the multilayer composite thin film structure.

2 Claims, 2 Drawing Sheets

(51) Int. Cl.
*G01N 29/24* (2006.01)
*G01N 3/00* (2006.01)

(52) U.S. Cl.
CPC ... *G01N 29/2418* (2013.01); *G01N 2291/014* (2013.01); *G01N 2291/0231* (2013.01); *G01N 2291/0237* (2013.01); *G01N 2291/0427* (2013.01)

(58) Field of Classification Search
CPC ... G01N 2291/0237; G01N 2291/0231; G01N 21/75; G01B 9/02004
See application file for complete search history.

METHOD AND DEVICE FOR MEASURING MECHANICAL PARAMETERS OF MULTILAYER COMPOSITE THIN FILM STRUCTURE

TECHNICAL FIELD

The present invention relates to a method and device for measuring mechanical parameters of a multilayer composite thin film structure, and belongs to the technical field of online tests of micro-electro-mechanical system (MEMS for short) material parameters.

BACKGROUND ART

The full name of MEMS is micro-electro-mechanical system which is also known as micro-electro-mechanical system, micro-system, micro-machine, etc., it refers to a high-tech device with a size of several millimeters or even smaller size, its internal structure is generally at a magnitude of micron or nanometer, and it is an independent intelligent system. An MEMS mainly consists of three major parts, i.e., a sensor, an actuator and a micro-energy source. The micro-electro-mechanical system involves many disciplines and engineering technologies, such as physics, semiconductor, optics, electronic engineering, chemistry, material engineering, mechanical engineering, medicine, information engineering and biological engineering, and opens up a wide range of applications in the fields of intelligent systems, consumer electronics, wearable devices, smart home, synthetic biology of system biotechnology and microfluidic technology. Common products include MEMS accelerometers, MEMS microphones, micro-motors, micro-pumps, micro-oscillators, MEMS pressure sensors, MEMS gyroscopes, and MEMS humidity sensors.

With the development of the MEMS technology, a variety of micro-mechanical components, such as micro-cantilever beams and micro-bridges, have been made by adopting surface micro-machining technology and bulk silicon processing technology. Because of small size, these micro-mechanical components are often regarded as thin film structures in macroscopic view. There are considerable differences between their mechanical behaviors and macroscopic bulk mechanical materials. The mechanical properties of these micro-mechanical components cannot be measured by adopting the mechanical parameters of the macroscopic mechanical materials we are familiar with. The mechanical properties of thin film materials are quite different from those of bulk materials with the same chemical compositions. Various traditional mechanical property test techniques and equipment cannot be directly used to test thin film materials. Therefore, it is especially important to control the mechanical parameters of thin film materials (e.g., residual stress, Young modulus, fatigue strength, fracture strength and Poisson modulus) in the processing of surface micro-machined structures. In the field of MEMS, the research and test of mechanical properties of thin films are becoming a new research hotspot, which have aroused the interest of researchers in microelectronics, mechanics, physics, materials and other fields.

For many kinds of materials, especially crystalline materials in the formation of thin films, thin beams and other structures, under different processing conditions, even the same materials often show distinct different material characteristics. Similarly, even if the same process is adopted, different thermal parameters shown in different production environments are obviously different, and thus different mechanical parameters, such as density, Young modulus, residual stress and so on are shown. However, if the above-mechanical parameters are known, some static or dynamic responses of sensors and actuators can be easily estimated from other measured parameters. Therefore, online monitoring of mechanical parameters of thin film structures is of a great significance to MEMS devices.

On the one hand, because of the relatively small size, it is difficult to measure the material parameters of thin films using classical macroscopic characterization technique. On the other hand, CMOS MEMS devices often use multilayer thin film structures, but it is not easy to apply the existing methods for measuring the mechanical parameters of single-layer thin films to the measurement of parameters of multilayer thin film materials. Therefore, the establishment of process compatible online test structures and test methods for mechanical parameters of multilayer thin films is of a great significance to monitoring the mechanical properties of the materials, predicting and optimizing the performance of the products, and ensuring the reliability, uniformity and long-term stability of the products.

The existing methods for measuring Young modulus of thin film materials include nano-indentation method, electrostatic absorption method, bubbling method, etc. However, the nano-indentation method will damage the film; the electrostatic absorption method, after many measurements, will cause measurement errors because of electrostatic accumulation, and it is only suitable for measuring conductive materials; the bubbling method requires high flatness and roughness of the worktable, and the bonding quality between the film components and the worktable directly affects the success of the test.

The Chinese invention patent CN101493389 discloses a method for online measurement of Young modulus of MEMS thin films based on a resonance frequency method. In this method, a circular MEMS thin film with a fixed center is fabricated. The anchor area of the thin film is fixed on the planar substrate. The Young modulus of the thin film material is calculated by measuring the resonance frequency of the MEMS circular thin film. The invention is mainly applicable to single-layer thin films, but the market demand for the measurement of multilayer thin film materials is increasing, and the extraction of mechanical parameters of single-layer thin film materials cannot be directly applied to multilayer thin films.

SUMMARY OF THE INVENTION

The technical problem to be solved by the present invention is to overcome the defects of the prior art and provides a method for measuring mechanical parameters of a multilayer composite thin film structure. Equivalent Young modulus and equivalent residual stress of each layer of the multilayer composite thin film structure can be obtained in one step by means of solving an equation set on the basis of a relationship between first-order resonance frequency of multilayer composite fixed-fixed beams and multilayer composite cantilever beams and parameters such as material characteristics and structure size, the online test of multilayer thin film materials can be realized, the test structure and calculating method are simple, and the accuracy is higher.

In order to solve the above-mentioned technical problem, the present invention specifically adopts the following technical solution:

A method for measuring mechanical parameters of a multilayer composite thin film structure is provided, the multilayer composite thin film structure is an initially flat and straight N-layer composite thin film structure, where N is an integer greater than or equal to 2, and the method comprises the following steps:

step 1: preparing a group of at least N initially flat and straight N-layer composite cantilever beam test structures and a group of at least N initially flat and straight N-layer composite fixed-fixed beam test structures by adopting a process for preparing the multilayer composite thin film structure, wherein the material parameters except the geometric size of each test structure are the same; and for each group of test structures, if a vector consisting of the width and length of each layer of each test structure is used as the dimension vector of the test structure, the dimension vector group of the group of test structures is linearly independent;

step 2: measuring the first-order resonance frequency of each test structure;

step 3: respectively substituting the first-order resonance frequency of the N-layer composite cantilever beam test structures into a first-order resonance frequency expression of N-layer composite cantilever beams to obtain an equation set consisting of at least N linear equations, and solving the equation set to obtain the equivalent Young modulus of each layer of the multilayer composite thin film structure, wherein the expression of the first-order resonance frequency $f_{1cf}$ of the N-layer composite cantilever beams is specifically as follow:

$$f_{1cf} = \frac{1.875^2}{2\pi l^2} \sqrt{\frac{\sum_{i=1}^{N} \tilde{E}_i w_i \cdot [(z_i - z_c)^3 - (z_{i-1} - z_c)^3]}{3\sum_{i=1}^{N} \rho_i w_i h_i}}$$

where l is the length of the N-layer composite cantilever beam test structures; the width of the $i^{th}$ layer thin film material is $w_i$, the thickness is $h_i$, the density of the material is $\rho_i$, and the equivalent Young modulus is $\tilde{E}_i$; $z_i$ is the position of the top surface of the $i^{th}$ layer thin film material on a z axis, and $z_c$ is the height of the neutral surface; and step 4: respectively substituting the first-order resonance frequency of the N-layer composite fixed-fixed beam test structures and the equivalent Young modulus of each layer of the multilayer composite thin film structure obtained in step 3 into the first-order resonance frequency expression of the N-layer composite fixed-fixed beams to obtain an equation set consisting of at least N equations, and solving the equation set to obtain the equivalent residual stress of each layer of the multilayer composite thin film structure, wherein the expression of the first-order resonance frequency $f_{1s}$ of the N-layer composite fixed-fixed beams is specifically as follow:

$$f_{1s} = \frac{4.730^2}{2\pi l^2} \sqrt{\frac{\sum_{i=1}^{N} \tilde{E}_i w_i \left[\left(\sum_{j=0}^{i} h_j - z_c\right)^3 - \left(\sum_{j=0}^{i-1} h_j - z_c\right)^3\right]}{3\sum_{i=1}^{N} \rho_i w_i h_i} + \frac{l^2}{4\pi^2} \frac{\sum_{i=1}^{N} \tilde{\sigma}_i w_i h_i}{\sum_{i=1}^{N} \rho_i w_i h_i}}$$

where l is the length of the N-layer composite fixed-fixed beam test structures; the width of the $i^{th}$ layer thin film material is $w_i$, the thickness is $h_i$, the density of the material is $\rho_i$, the equivalent Young modulus is $\tilde{E}_i$, and the equivalent residual stress is $\tilde{\sigma}_i$; and $z_c$ is the height of the neutral surface.

According to the same invention concept, the following technical solution can also be obtained:

A device for measuring mechanical parameters of a multilayer composite thin film structure is provided, the multilayer composite thin film structure is an initially flat and straight N-layer composite thin film structure, where N is an integer greater than or equal to 2, and the device comprises:

a group of at least N initially flat and straight N-layer composite cantilever beam test structures prepared by adopting a process for preparing the multilayer composite thin film structure, wherein the material parameters except the geometric size of each test structure are the same; and if a vector consisting of the width and length of each layer of each test structure is used as the dimension vector of the test structure, the dimension vector group of the group of test structures is linearly independent;

a group of at least N initially flat and straight N-layer composite fixed-fixed beam test structures prepared by adopting the process for preparing the multilayer composite thin film structure, wherein the material parameters except the geometric size of each test structure are the same; and if a vector consisting of the width and length of each layer of each test structure is used as the dimension vector of the test structure, the dimension vector group of the group of test structures is linearly independent;

a resonance frequency measuring unit used for measuring the first-order resonance frequency of each test structure;

a calculation unit used for respectively substituting the first-order resonance frequency of the N-layer composite cantilever beam test structures into a first-order resonance frequency expression of N-layer composite cantilever beams to obtain an equation set consisting of at least N linear equations, and solving the equation set to obtain the equivalent Young modulus of each layer of the multilayer composite thin film structure; and then substituting the first-order resonance frequency of the N-layer composite fixed-fixed beam test structures and the equivalent Young modulus of each layer of the multilayer composite thin film structure into the first-order resonance frequency expression of the N-layer composite fixed-fixed beams to obtain an equation set consisting of at least N equations, and solving the equation set to obtain the equivalent residual stress of each layer of the multilayer composite thin film structure, wherein, the expression of the first-order resonance frequency $f_{1cf}$ of the N-layer composite cantilever beams is specifically as follow:

$$f_{1cf} = \frac{1.875^2}{2\pi l^2} \sqrt{\frac{\sum_{i=1}^{N} \tilde{E}_i w_i \cdot [(z_i - z_c)^3 - (z_{i-1} - z_c)^3]}{3\sum_{i=1}^{N} \rho_i w_i h_i}}$$

where l is the length of the N-layer composite cantilever beam test structures; the width of the $i^{th}$ layer thin film material is $w_i$, the thickness is $h_i$, the density of the material is $\rho_i$, and the equivalent Young modulus is $\tilde{E}_i$; $z_i$ is the position of the top surface of the $i^{th}$ layer thin film material on a z axis, and $z_c$ is the height of the neutral surface; and the expression of the first-order resonance frequency $f_{1s}$ of the N-layer composite fixed-fixed beams is specifically as follow:

$$f_{1s} = \frac{4.730^2}{2\pi l^2} \sqrt{\frac{\sum_{i=1}^{N} \tilde{E}_i w_i \left[\left(\sum_{j=0}^{i} h_j - z_c\right)^3 - \left(\sum_{j=0}^{i-1} h_j - z_c\right)^3\right]}{3\sum_{i=1}^{N} \rho_i w_i h_i} + \frac{l^2}{4\pi^2} \frac{\sum_{i=1}^{N} \tilde{\sigma}_i w_i h_i}{\sum_{i=1}^{N} \rho_i w_i h_i}}$$

where l is the length of the N-layer composite fixed-fixed beam test structures; the width of the $i^{th}$ layer thin film material is $w_i$, the thickness is $h_i$, the density of the material is $\rho_i$, the equivalent Young modulus is $\tilde{E}_i$, and the equivalent residual stress is $\tilde{\sigma}_i$; and $z_c$ is the height of the neutral surface.

Compared with the prior art, the present invention has the following beneficial effects:

By using the combined test structure of multilayer cantilever beams and multilayer fixed-fixed beams, based on the relationship between the first-order resonance frequency of the multilayer fixed-fixed beams and the multilayer cantilever beams and the parameters such as material characteristics and structure size, the equivalent Young modulus and the equivalent residual stress of each layer of the multilayer composite thin film structure can be obtained in one step, and the problem that it is difficult to measure the mechanical parameters of the multilayer composite thin film structure is effectively solved.

The test method of the present invention is simple, the requirements on test equipment are low, the test process is stable, the calculation process is simple and convenient, and the test accuracy is high.

The processing process of the test structure of the present invention is synchronized with the processing of microelectromechanical components, there is no special processing requirement, and thus it fully satisfies the requirement of online test.

Figure 1A:
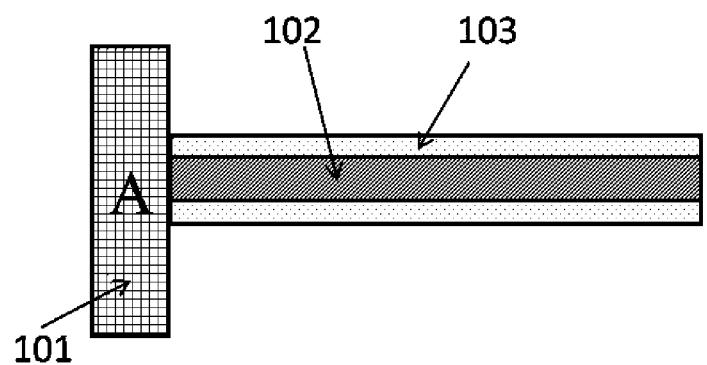
FIG. 1a is a top view of a two-layer composite cantilever beam test structure.

Reference signs in the drawings respectively have the following meanings:

101: anchor area, 102: top layer, 103: bottom layer, and 104: substrate.

DETAILED DESCRIPTION OF THE INVENTION

Aiming at the problem about online test of the mechanical parameters of multilayer composite thin film structures, in the present invention, by using the combined test structure of multilayer cantilever beams and multilayer fixed-fixed beams, based on the relationship between the first-order resonance frequency of the multilayer fixed-fixed beams and the multilayer cantilever beams and the parameters such as material characteristics and structure size, the equivalent Young modulus and the equivalent residual stress of each layer of the multilayer composite thin film structure can be obtained in one step, the calculation process is simple and convenient, and the test accuracy is high.

In order to facilitate the public to understand the technical solution of the present invention, the theoretical principle of the technical solution of the present invention is described in detail at first.

For a composite thin film structure formed by at least two layers of thin film structures through combination, when the width and thickness of the thin film satisfy $w_i < 5h_i$, that is, when the thin film structure is a narrow beam, the equivalent Young modulus $\tilde{E}_i$ is the Young modulus itself; and when the width and thickness of the thin film satisfy $w_i \geq 5h_i$, that is, when the thin film is a wide beam, the equivalent Young modulus is a relational expression between Young modulus and Poisson ratio, that is $$\tilde{E}_i = \frac{E_i}{1 - v_i^2}.$$

The relationship between the equivalent Young modulus $\tilde{E}_i$ of the $i^{th}$ layer thin film and the thickness and width of the thin film is as follow:

$$\tilde{E}_i = \begin{cases} E_i & , \; w_i < 5h_i \\ \dfrac{E_i}{1 - v_i^2} & , \; w_i \geq 5h_i \end{cases} \quad (1)$$

It is assumed that the length of the beam is l before the release process (i.e., when no deformation occurs); the width of the $i^{th}$ layer thin film material is $w_i$, the thickness is $h_i$, the density of the material is $\rho_i$, and the Young modulus is $E_i$. If the position of the bottom surface of the multilayer thin film on z axis is $z_0$, $z_0 = 0$, and the position of the top surface of the $i^{th}$ layer from bottom to top is $z_i$, then:

$$z_i = \sum_{i=1}^{i} h_i \quad (2)$$

the height of the neutral surface $z_c$ is:

$$z_c = \frac{\sum_{i=1}^{N} \tilde{E}_i w_i (z_i^2 - z_{i-1}^2)}{2 \sum_{i=1}^{N} \tilde{E}_i w_i (z_i - z_{i-1})} \quad (3)$$

the moment of inertia $I_i$ of the cross-sectional area of the $i^{th}$ layer thin film material with respect to the neutral axis is:

$$I_i = \tfrac{1}{3} w_i [(z_i - z_c)^3 - (z_{i-1} - z_c)^3] \quad (4)$$

the bending rigidity, linear density and axial load of the micromechanical thin film beam are defined as $\overline{EI}$, $\overline{\rho A}$ and $\overline{\sigma A}$ respectively, i.e.:

$$\overline{EI} = \sum_{i=1}^{N} \tilde{E}_i I_i \quad (5)$$

-continued $$\overline{\rho A} = \sum_{i=1}^{N} \rho_i A_i \qquad (6)$$

$$\overline{\sigma A} = \sum_{i=1}^{N} \tilde{\sigma}_i A_i \qquad (7)$$

where $A_i$ is the cross-sectional area of the $i^{th}$ layer thin film material, $\rho_i$ is the density of the $i^{th}$ layer thin film material, and $\tilde{\sigma}_i$ is the equivalent residual stress of the $i^{th}$ layer thin film material.

For the initially flat and straight multilayer cantilever beam, the differential equation of transverse vibration of the micromechanical multilayer thin film cantilever beam is as follow:

$$EI\frac{\partial^4 z(x,t)}{\partial x^4} = -\overline{\rho A}\frac{\partial^2 z(x,t)}{\partial t^2} \qquad (8)$$

where $z(x,t)$ is the height displacement when the beam transversely vibrates. The first-order resonance frequency formula of the multilayer cantilever beam which is kept flat and straight after release is obtained by solving the equation using the method of separation of variables, taking $z(x,t)=Z(x)T(t)$ and substituting it into the equation (8) for solution:

$$f_{1cf} = \frac{1.875^2}{2\pi l^2}\sqrt{\frac{EI}{\overline{\rho A}}} \qquad (9)$$

$$= \frac{1.875^2}{2\pi l^2}\sqrt{\frac{\sum_{i=1}^{N}\tilde{E}_i w_i \cdot [(z_i - z_c)^3 - (z_{i-1} - z_c)^3]}{3\sum_{i=1}^{N}\rho_i w_i h_i}}$$

The subscript 1 of the frequency value represents the first-order resonance frequency, and cf represents that the boundary condition is cantilever beam.

Based on the above-mentioned linear equation, the first-order resonance frequency can be respectively and actually measured by using a group of multilayer composite cantilever beam test structures with the same material parameters except the geometric size. According to the measured first-order resonance frequency and the size parameters of the test structures, a linear equation set can be established, and the equivalent Young modulus of each layer of the corresponding multilayer thin film structure can be obtained by solving the equation set.

When the initially flat and straight multilayer thin film fixed-fixed beam vibrates near the equilibrium point, it is linear small-deformation vibration. When the height displacement of the beam is $z(x,t)$ when it transversely vibrates, any cross section which is perpendicular to the length direction inside is not only subjected to the bending moment caused by the internal stress formed by bending and the bending moment generated by the load on the unit length, but also subjected to the bending moment caused by the axial force P to the offset from the balanced position of the cross section. The bending moment is $Pz(x,t)$, and the above-mentioned relationship can be described as:

$$\kappa\overline{EI}=M+Pz(x,t) \qquad (10)$$

Under the condition of small-deformation vibration, the differential equation of the small-angle bending of the micromechanical thin film beam is as follow:

$$\kappa = \frac{d^2 z(x,t)}{dx^2} \qquad (11)$$

For a beam section with a length of dx and internal acting force and inertial acting force acting on it, the relationship among shear force V, bending moment M and load p(x) of the beam on the unit length is as follow:

$$\frac{d^2 M}{dx^2} = \frac{dV}{dx} = p(x) \qquad (12)$$

For a beam that transversely vibrates, the load of the beam on the unit length is equal to the load that overcomes the inertia force produced by the mass (i.e., linear density $\overline{\rho A}$) and acceleration of the beam on the unit length, i.e.:

$$p(x) = -\overline{\rho A}\frac{\partial^2 z(x,t)}{\partial t^2} \qquad (13)$$

Formulas (10), (11) and (13) are substituted into formula (12) to finally obtain:

$$EI\frac{\partial^4 z(x,t)}{\partial x^4} - \overline{\sigma A}\frac{\partial^2 z(x,t)}{\partial x^2} = -\overline{\rho A}\frac{\partial^2 z(x,t)}{\partial t^2} \qquad (14)$$

The equation is the differential equation of the transverse vibration of the micromechanical thin film fixed-fixed beam. The equation is solved by the method of separation of variables. It is allowed that $z(x,t)=Z(x)T(t)$, it is substituted into the formula (14), and the general solution of amplitude Z(x) can be obtained as follow:

$$Z(x) = C_1 \sin(\lambda_1 x) + C_1 \cos(\lambda_1 x) + C_3 \sinh(\lambda_2 x) + C_4 \cosh(\lambda_2 x) \qquad (15)$$

where $\lambda_1 = \sqrt{\left(\sqrt{\beta_1^2 + 4\beta_2} - \beta_1\right)/2}$, $$\lambda_2 = \sqrt{\left(\sqrt{\beta_1^2 + 4\beta_2} + \beta_1\right)/2}, \beta_1 = \frac{\overline{\sigma A}}{EI}, \beta_2 = \frac{\overline{\rho A}}{EI}\omega^2.$$

It can be considered that the first-order resonance mode of the thin film fixed-fixed beam is assumed to be the shape of a cosine function, i.e., $Z_1(x)=b[1-\cos(2\pi x/l)]$. For this form, there is the following relationship:

$$Z_1^{(4)}(x) = -\frac{4\pi^2}{l^2}Z_1''(x) \qquad (16)$$

This relational expression is substituted into the equation of amplitude Z(x) to obtain:

$$\left[EI + \frac{l^2}{4\pi^2}\overline{\sigma A}\right]Z^{(4)}(x) - \omega^2 \overline{\rho A} Z(x) = 0 \quad (17)$$

By solving the formula, the approximate analytical formula of the first-order resonance frequency of the initially flat and straight multilayer thin film fixed-fixed beam with residual stress can be obtained:

$$f_{1s} = \frac{4.730^2}{2\pi l^2}\sqrt{\frac{EI}{\overline{\rho A}} + \frac{l^2}{4\pi^2}\frac{\overline{\sigma A}}{\overline{\rho A}}} \quad (18)$$

The subscript 1 of the frequency value represents the first-order resonance frequency, and the subscript s represents that it is kept flat and straight after release.

It can be seen from the above-mentioned formula that the first-order resonance frequency of the multilayer fixed-fixed beams is related to the material parameters and structural geometric size of the beams. On this basis, the first-order resonance frequency of the multilayer fixed-fixed beam can be regarded as an implicit function of Young modulus and residual stress determined by the above-mentioned formulas:

$$f_{1s} = \frac{4.730^2}{2\pi l^2} \quad (19)$$

$$\sqrt{\frac{\sum_{i=1}^{N}\tilde{E}_i w_i\left[\left(\sum_{i=0}^{i}h_i - z_c\right)^3 - \left(\sum_{i=0}^{i-1}h_i - z_c\right)^3\right]}{3\sum_{i=1}^{N}\rho_i w_i h_i} + \frac{l^2}{4\pi^2}\frac{\sum_{i=1}^{N}\tilde{\sigma}_i w_i h_i}{\sum_{i=1}^{N}\rho_i w_i h_i}}$$

where, l is the length of the N-layer composite fixed-fixed beam; the width of the $i^{th}$ layer thin film material is $w_i$, the thickness is $h_i$, the density of the material is $\rho_i$, the equivalent Young modulus is $\tilde{E}_i$, the equivalent residual stress is $\tilde{\sigma}_i$; and $z_c$ is the height of the neutral surface.

Based on the implicit function mentioned above, the first-order resonance frequency can be respectively and actually measured by using a group of multilayer composite cantilever beam test structures with the same material parameters except the geometric size. According to the measured first-order resonance frequency and the size parameters of the test structures, a linear equation set can be established, and the equivalent Young modulus of each layer of the multiplayer composite fixed-fixed beam can be obtained by solving the equation set.

However, considering the difficulty in solving the nonlinear equation set, in order to reduce the calculation complexity, the equivalent Young modulus of each layer of the multilayer thin film structure can be obtained firstly by using the multilayer composite cantilever beam test structure, and then the equivalent residual stress of each layer of the multilayer thin film structure can be calculated by using the multilayer composite fixed-fixed beam test structure and the obtained equivalent Young modulus of each layer of the multilayer thin film structure. To sum up, the technical solution of the present invention can be obtained as follow:

step 1: preparing a group of at least N initially flat and straight N-layer composite cantilever beam test structures and a group of at least N initially flat and straight N-layer composite fixed-fixed beam test structures by adopting a process for preparing the multilayer composite thin film structure, wherein the material parameters except the geometric size of each test structure are the same; and for each group of test structures, if a vector consisting of the width and length of each layer of each test structure is used as the dimension vector of the test structure, the dimension vector group of the group of test structures is linearly independent;

step 2: measuring the first-order resonance frequency of each test structure;

step 3: respectively substituting the first-order resonance frequency of the N-layer composite cantilever beam test structures into a first-order resonance frequency expression of N-layer composite cantilever beams, i.e., formula (9), to obtain an equation set consisting of at least N linear equations, and solving the equation set to obtain the equivalent Young modulus of each layer of the multilayer composite thin film structure; and step 4: respectively substituting the first-order resonance frequency of the N-layer composite fixed-fixed beam test structures and the equivalent Young modulus of each layer of the multilayer composite thin film structure obtained in step 3 into the first-order resonance frequency expression of the N-layer composite fixed-fixed beams, i.e., formula (19), to obtain an equation set consisting of at least N equations, and solving the equation set to obtain the equivalent residual stress of each layer of the multilayer composite thin film structure.

In order to further help the public understand, the technical solution of the present invention will be further described below by taking the simplest two-layer thin film structure as an example.

In step 1, a group of at least two initially flat and straight two-layer composite cantilever beam test structures and a group of at least two initially flat and straight two-layer composite fixed-fixed beam test structures are prepared by adopting a process for preparing the multilayer composite thin film structure, wherein the material parameters except the geometric size of each test structure are the same; and for each group of test structures, if a vector consisting of the width and length of each layer of each test structure is used as the dimension vector of the test structure, the dimension vector group of the group of test structures is linearly independent.

Figure 1B:
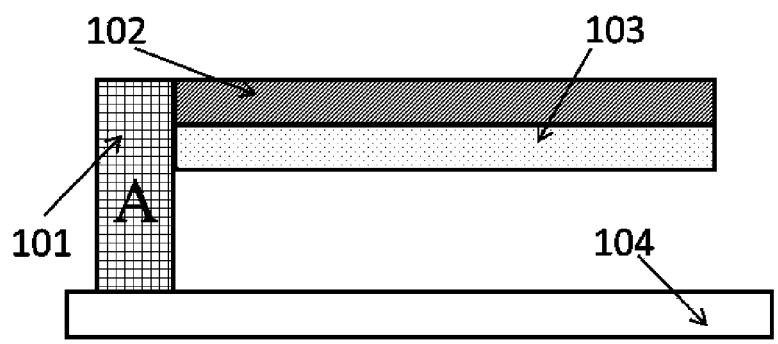
FIG. 1b is a front view of a two-layer composite cantilever beam test structure.
Figure 2A:
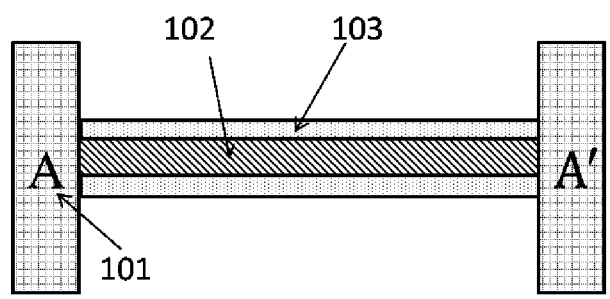
FIG. 2a is a top view of a two-layer composite fixed-fixed beam test structure.
Figure 2B:
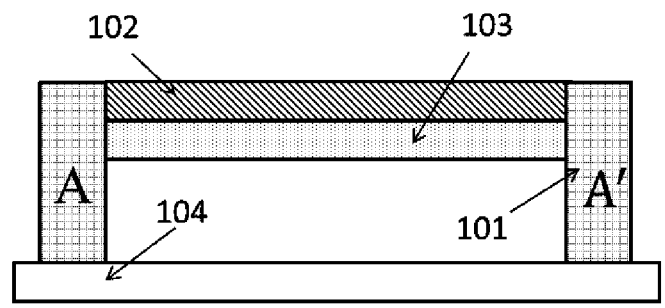
FIG. 2b is a front view of a two-layer composite fixed-fixed beam test structure.

The prepared two-layer composite cantilever beam test structure is illustrated in FIGS. 1a and 1b, the prepared two-layer composite fixed-fixed beam test structure is illustrated in FIG. 2a and FIG. 2b, each of which comprises a top layer 102 and a bottom layer 103. In the drawings, 101 represents an anchor area and 104 represents a substrate.

For the two-layer composite cantilever beam consisting of two layers of thin film materials, there are two mechanical parameters to be solved. At this time, at least two two-layer composite cantilever beam test structures with different sizes are needed. If a vector consisting of the width and length of each layer of each test structure is used as the dimension vector of the test structure, in order to enable the established equation to have a solution, the dimension vectors of all test structures must be linearly independent.

Similarly, for the two-layer composite fixed-fixed beam consisting of two layers of thin film materials, since the equivalent Young modulus of each layer is known, the equivalent residual stress of each layer remains unknown. At this time, at least two two-layer composite fixed-fixed beam test structures with different sizes are needed. Similarly, if a vector consisting of the width and length of each layer of each test structure is used as the dimension vector of the test structure, in order to enable the established equation to have a solution, the dimension vectors of all test structures must be linearly independent.

In order to simplify the preparation and calculation process of the test structures, in the present embodiment, the remaining parts except the width of the bottom layers of the two test structures in each group are fully identical.

In step 2, the first-order resonance frequency of each test structure is measured.

The measurement of the first-order resonance frequency can be realized by various existing techniques, such as electrostatic excitation, thermal excitation and acoustic excitation. In the present embodiment, the resonance frequency of the test structure is measured by using the MSV-400-M2 Laser Doppler Vibrometer (LDV) of Polytech Company, Germany. The specific method is as follows: piezoelectric ceramic (PZT) is placed in the LDV test field of view, the sample chip to be tested is pasted on the PZT, and the PZT is driven to vibrate by applying a voltage signal. The chip transmits the mechanical vibration signal to the test structure under the excitation of the PZT, the excitation signal is transmitted to the beam structure through the anchor area of the test structure, and finally the substrate excitation form, which is also called as the inertial force excitation form, in the vibration mechanics is formed. Ideally, the frequency spectrum of the substrate excitation should be as smooth as possible, and the resonant beam will be forced to vibrate under uniform excitation in the whole band. Resonance will be generated near the eigenfrequency due to selective amplification, and a resonance peak will be formed in the vibration spectrum. It is supposed that the first-order resonance frequency of two two-layer composite cantilever beam test structures is respectively $f_1$, $f_2$, and the first-order resonance frequency of two two-layer composite fixed-fixed beam test structures are respectively $f_3$, $f_4$.

In step 3, the first-order resonance frequency of the two-layer composite cantilever beam test structures is respectively substituted into a first-order resonance frequency expression of two-layer composite cantilever beams, i.e., formula (9), to obtain an equation set consisting of at least two linear equations, and the equation set is solved to obtain the equivalent Young modulus of each layer of the two-layer composite thin film structure.

Assuming that the length of the two test structures is $l_1$, the thickness of each layer is h, the top layer width is $w_1$, the bottom layer width is respectively $w_2$ and w3, and $w_2 \ne w_3$. According to formula (8), the following equation set can be obtained:

$$\begin{cases} f_{1cf}(\tilde{E}_1, \tilde{E}_2, w_1, w_2, l_1) = f_1 \\ f_{1cf}(\tilde{E}_1, \tilde{E}_2, w_1, w_3, l_1) = f_2 \end{cases}$$

where $\tilde{E}_1$, $\tilde{E}_2$ are respectively equivalent Young modulus of the top layer and the bottom layer.

Because the above-mentioned formula is a linear analytic formula for the first-order resonance frequency of two-layer cantilever beams, which corresponds to only one frequency value (i.e., the first-order resonance frequency), a finite set of real solutions and complex solutions for Young modulus can be obtained by solving the mechanical parameters of the material according to the known frequency and geometric size, wherein the complex solutions do not comply with the actual situation, but under the general situation, in engineering application, the only set of real solutions which complies with the value range of material parameters in the remaining several sets of real solutions can be identified clearly. The calculated equivalent Young modulus of the top layer and the bottom layer is the equivalent Young modulus of the upper layer and the lower layer of the two-layer composite thin film structures prepared by adopting the same preparation process.

In step 4, the first-order resonance frequency of the two-layer composite fixed-fixed beam test structures and the equivalent Young modulus of each layer of the two-layer composite thin film structure obtained in step 3 are respectively substituted into the first-order resonance frequency expression of the two-layer composite fixed-fixed beams, i.e., formula (19), to obtain an equation set consisting of at least two equations, and the equation set is solved to obtain the equivalent residual stress of each layer of the two-layer composite thin film structure.

Assuming that the length of two two-layer composite fixed-fixed beam test structures is $l_2$, the top layer width is $w_4$, and the bottom layer width of the two test structures is respectively $w_5$ and $w_6$, and $w_5 \ne w_6$, the equivalent Young modulus which has been solved is substituted into the equation set for solving, then the equivalent residual stress of each layer of the test structures can be obtained, and the equation set is as follow:

$$\begin{cases} f_{1s}(\tilde{E}_1, \tilde{E}_2, \tilde{\sigma}_1, \tilde{\sigma}_2, w_4, w_5, l_2) = f_3 \\ f_{1s}(\tilde{E}_1, \tilde{E}_2, \tilde{\sigma}_1, \tilde{\sigma}_2, w_4, w_6, l_2) = f_4 \end{cases}$$

The calculated equivalent residual stress of the top layer and the bottom layer is the equivalent residual stress of the upper layer and the lower layer of the two-layer composite thin film structures prepared by adopting the same preparation process.

What is claimed is:

1. A method for measuring mechanical parameters of a multilayer composite thin film structure, the multilayer composite thin film structure being an initially flat and straight N-layer composite thin film structure, where N is an integer greater than or equal to 2, wherein the method comprises the following steps:

step 1: preparing a group of at least N initially flat and straight N-layer composite cantilever beam test structures and a group of at least N initially flat and straight N-layer composite fixed-fixed beam test structures by adopting a process for preparing the multilayer composite thin film structure, wherein the material parameters except the geometric size of each test structure are the same; and for each group of test structures, if a vector consisting of the width and length of each layer of each test structure is used as the dimension vector of the test structure, the dimension vector group of the group of test structures is linearly independent;

step 2: measuring the first-order resonance frequency of each test structure;

step 3: respectively substituting the first-order resonance frequency of the N-layer composite cantilever beam test structures into a first-order resonance frequency expression of N-layer composite cantilever beams to obtain an equation set consisting of at least N linear equations, and solving the equation set to obtain the equivalent Young modulus of each layer of the multilayer composite thin film structure, wherein the expression of the first-order resonance frequency $f_{1cf}$ of the N-layer composite cantilever beams is specifically as follow:

$$f_{1cf} = \frac{1.875^2}{2\pi l^2} \sqrt{\frac{\sum_{i=1}^{N} \tilde{E}_i w_i \cdot [(z_i - z_c)^3 - (z_{i-1} - z_c)^3]}{3 \sum_{i=1}^{N} \rho_i w_i h_i}}$$

where l is the length of the N-layer composite cantilever beam test structures; the width of the $i^{th}$ layer thin film material is $w_i$, the thickness is $h_i$, the density of the material is $\rho_i$, and the equivalent Young modulus is $\tilde{E}_i$; $z_i$ is the position of the top surface of the $i^{th}$ layer thin film material on a z axis, and $z_c$ is the height of the neutral surface; and step 4: respectively substituting the first-order resonance frequency of the N-layer composite fixed-fixed beam test structures and the equivalent Young modulus of each layer of the multilayer composite thin film structure obtained in step 3 into the first-order resonance frequency expression of the N-layer composite fixed-fixed beams to obtain an equation set consisting of at least N equations, and solving the equation set to obtain the equivalent residual stress of each layer of the multilayer composite thin film structure, wherein the expression of the first-order resonance frequency $f_{1s}$ of the N-layer composite fixed-fixed beams is specifically as follow:

$$f_{1s} = \frac{4.730^2}{2\pi l^2} \sqrt{\frac{\sum_{i=1}^{N} \tilde{E}_i w_i \left[\left(\sum_{i=0}^{i} h_i - z_c\right)^3 - \left(\sum_{i=0}^{i-1} h_i - z_c\right)^3\right]}{3 \sum_{i=1}^{N} \rho_i w_i h_i} + \frac{l^2}{4\pi^2} \frac{\sum_{i=1}^{N} \tilde{\sigma}_i w_i h_i}{\sum_{i=1}^{N} \rho_i w_i h_i}}$$

where l is the length of the N-layer composite fixed-fixed beam test structures; the width of the $i^{th}$ layer thin film material is $w_i$, the thickness is $h_i$, the density of the material is $\rho_i$, the equivalent Young modulus is $\tilde{E}_i$, and the equivalent residual stress is $\tilde{\sigma}_i$; and $z_c$ is the height of the neutral surface.

2. A device for measuring mechanical parameters of a multilayer composite thin film structure, the multilayer composite thin film structure being an initially flat and straight N-layer composite thin film structure, where N is an integer greater than or equal to 2, wherein the device comprises:

a group of at least N initially flat and straight N-layer composite cantilever beam test structures prepared by adopting a process for preparing the multilayer composite thin film structure, wherein the material parameters except the geometric size of each test structure are the same; and if a vector consisting of the width and length of each layer of each test structure is used as the dimension vector of the test structure, the dimension vector group of the group of test structures is linearly independent;

a group of at least N initially flat and straight N-layer composite fixed-fixed beam test structures prepared by adopting the process for preparing the multilayer composite thin film structure, wherein the material parameters except the geometric size of each test structure are the same; and if a vector consisting of the width and length of each layer of each test structure is used as the dimension vector of the test structure, the dimension vector group of the group of test structures is linearly independent;

a resonance frequency measuring unit used for measuring the first-order resonance frequency of each test structure;

a calculation unit used for respectively substituting the first-order resonance frequency of the N-layer composite cantilever beam test structures into a first-order resonance frequency expression of N-layer composite cantilever beams to obtain an equation set consisting of at least N linear equations, and solving the equation set to obtain the equivalent Young modulus of each layer of the multilayer composite thin film structure; and then substituting the first-order resonance frequency of the N-layer composite fixed-fixed beam test structures and the equivalent Young modulus of each layer of the multilayer composite thin film structure into the first-order resonance frequency expression of the N-layer composite fixed-fixed beams to obtain an equation set consisting of at least N equations, and solving the equation set to obtain the equivalent residual stress of each layer of the multilayer composite thin film structure, wherein, the expression of the first-order resonance frequency $f_{1cf}$ of the N-layer composite cantilever beams is specifically as follow:

$$f_{1cf} = \frac{1.875^2}{2\pi l^2} \sqrt{\frac{\sum_{i=1}^{N} \tilde{E}_i w_i \cdot [(z_i - z_c)^3 - (z_{i-1} - z_c)^3]}{3 \sum_{i=1}^{N} \rho_i w_i h_i}}$$

where l is the length of the N-layer composite cantilever beam test structures; the width of the $i^{th}$ layer thin film material is $w_i$, the thickness is $h_i$, the density of the material is $\rho_i$, and the equivalent Young modulus is $\tilde{E}_i$; $z_i$ is the position of the top surface of the $i^{th}$ layer thin film material on a z axis, and $z_c$ is the height of the neutral surface; and the expression of the first-order resonance frequency $f_{1s}$ of the N-layer composite fixed-fixed beams is specifically as follow:

$$f_{1s} = \frac{4.730^2}{2\pi l^2} \sqrt{\frac{\sum_{i=1}^{N} \tilde{E}_i w_i \left[\left(\sum_{i=0}^{i} h_i - z_c\right)^3 - \left(\sum_{i=0}^{i-1} h_i - z_c\right)^3\right]}{3 \sum_{i=1}^{N} \rho_i w_i h_i} + \frac{l^2}{4\pi^2} \frac{\sum_{i=1}^{N} \tilde{\sigma}_i w_i h_i}{\sum_{i=1}^{N} \rho_i w_i h_i}}$$

where l is the length of the N-layer composite fixed-fixed beam test structures; the width of the $i^{th}$ layer thin film material is $w_i$, the thickness is $h_i$, the density of the material is $\rho_i$, the equivalent Young modulus is $\tilde{E}_i$, and the equivalent residual stress is $\tilde{\sigma}_i$; and $z_c$ is the height of the neutral surface.

* * * * *